United States Patent [19]

Gelles et al.

[11] Patent Number: 4,622,067

[45] Date of Patent: Nov. 11, 1986

[54] LOW ACTIVATION FERRITIC ALLOYS

[75] Inventors: David S. Gelles, West Richland, Wash.; Nasr M. Ghoniem, Granada Hills, Calif.; Roger W. Powell, Pasco, Wash.

[73] Assignee: The United States of America as represented by the United States Department of Energy, Washington, D.C.

[21] Appl. No.: 699,092

[22] Filed: Feb. 7, 1985

[51] Int. Cl.[4] ........................ C22C 38/24; C22C 38/22

[52] U.S. Cl. ........................................ 420/61; 420/73; 420/91; 376/900

[58] Field of Search ............ 75/126 E, 126 B, 126 C, 75/126 F; 148/36, 37; 376/900

[56] References Cited

U.S. PATENT DOCUMENTS

| | | | |
|---|---|---|---|
| 2,793,113 | 5/1957 | Rait et al. | 75/126 E |
| 2,905,577 | 1/1956 | Harris et al. | 75/126 E |
| 3,288,600 | 11/1960 | Johnsen, Jr. et al. | 75/126 E |
| 4,058,650 | 11/1977 | Kiyonaga et al. | 75/126 E |
| 4,533,406 | 8/1985 | Lechtenberg | 75/126 E |

FOREIGN PATENT DOCUMENTS

| | | | |
|---|---|---|---|
| 4744411 | 6/1967 | Japan | 75/126 E |
| 55-110758 | 8/1980 | Japan | 75/126 E |

*Primary Examiner*—Melvyn J. Andrews
*Assistant Examiner*—Deborah Yee
*Attorney, Agent, or Firm*—Edward W. Nypaver; Robert Southworth, III; Judson R. Hightower

[57] ABSTRACT

Low activation ferritic alloys, specifically bainitic and martensitic stainless steels, are described for use in the production of structural components for nuclear fusion reactors. They are designed specifically to achieve low activation characteristics suitable for efficient waste disposal. The alloys essentially exclude molybdenum, nickel, nitrogen and niobium. Strength is achieved by substituting vanadium, tungsten, and/or tantalum in place of the usual molybdenum content in such alloys.

9 Claims, 14 Drawing Figures

2Cr-0.5V

Scale: 1μm

2Cr-1V

Scale: 1μm

FIG 4
2 Cr-1.5 V
Scale: 1 μm
FIG 5
9 Cr-0.5 V
Scale: 1 μm
FIG 6
9 Cr-0.5 V-3 Mn
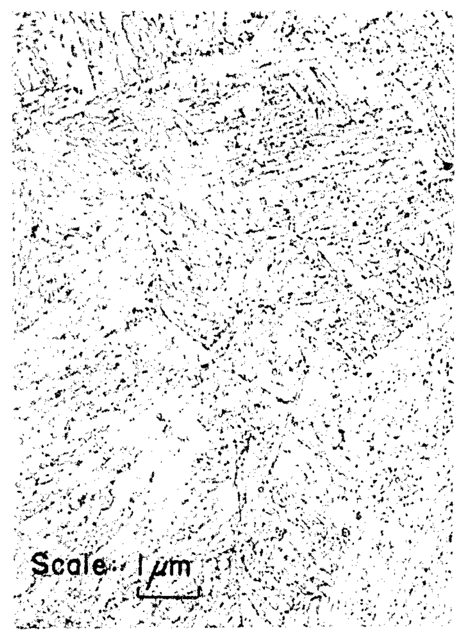
FIG 7
9 Cr-1 V-1 Mn
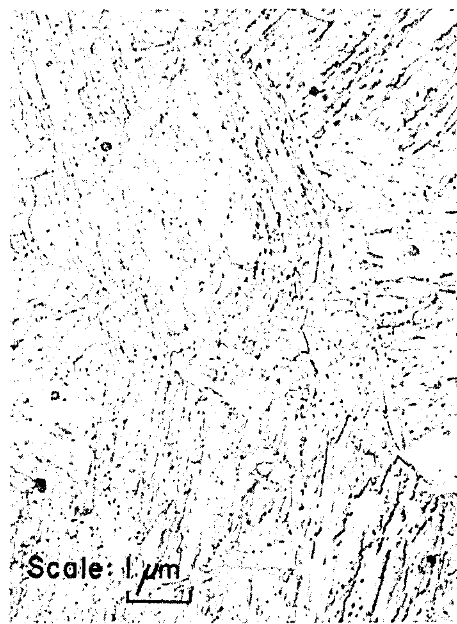

FIG. 8
9 Cr-1W-0.3V-2Mn
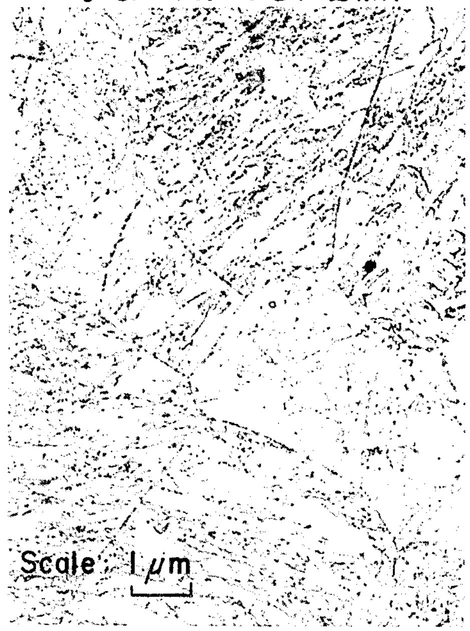
FIG. 9
12 Cr-1V-6Mn
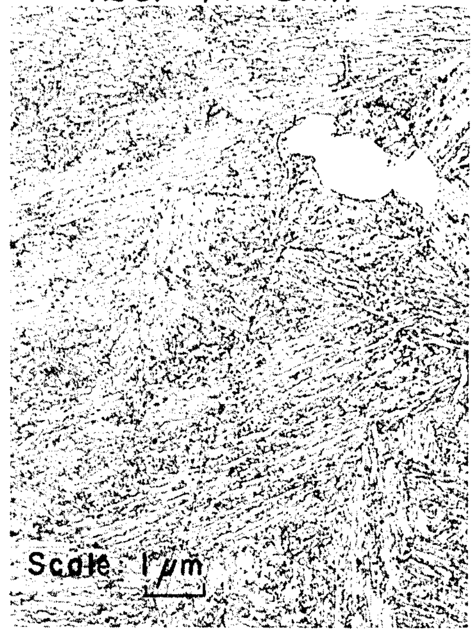
FIG. 10
12 Cr-1W-0.3V-6Mn YIELD STRESS, MPa
ALLOY 1
ALLOY 2
ALLOY 3
UNIRRADIATED
IRRADIATION TEMP., °C YIELD STRESS, MPa
ALLOY 9
RANGE OF BEHAVIOR OF ALLOYS 4-7
IRRADIATION TEMP., °C

TOTAL ELONGATION, %
ALLOY 2
ALLOY 3
ALLOY 1
IRRADIATION TEMP., °C

TOTAL ELONGATION, %
ALLOY 5
ALLOY 6
ALLOY 7
ALLOY 4
ALLOY 9 (12Cr)
UNIRRADIATED
IRRADIATION TEMP. °C

LOW ACTIVATION FERRITIC ALLOYS

The United States Government has rights in this invention pursuant to Contract No. DEAC06-76FF02170 between the United States Department of Energy and Westinghouse Electric Corporation.

BACKGROUND OF THE INVENTION

This disclosure relates to ferritic alloys, and specifically to development of low activation bainitic and martensitic stainless steels.

Ferritic alloys are required for structural usage in the development of commercial fusion systems, where the residual fuel and wastes will themselves have negligible residual radioactivity. For purposes of this disclosure, "low activation" shall be defined as a radiation level below 1 $Ci/m^3$ after waste disposal and burial for one hundred years.

Low activation characteristics have not been vital in the development of structural materials for use with nuclear fission reactors, since the high levels of long term radioactivity that persist in the spent fuel generated by a fission system far overshadows the amount of radioactivity in the surrounding structure. Most research and development with respect to long term radioactive levels has been directed to the fuel components, rather than to the machine structure.

This invention arose from a study designed to develop low activation bainitic and martensitic stainless steels for structural applications in the vicinity of nuclear fusion reaction processes. In the case of nuclear fusion reactors, the fusion reaction itself does not create any radioactive fuel components which require subsequent disposal. However, the bombardment of the surrounding machine structure by sub-elemental particles could result in production of isotopes which might have persistent radioactive levels throughout projected waste disposal storage times.

SUMMARY OF THE INVENTION

It is one object of the invention to develop ferritic alloy compositions having low activation characteristics.

Another object of this invention is to identify low activation ferritic alloys, and specifically low activation bainitic and martensitic stainless steels, which have strength properties capable of being utilized in fusion reactor structural components.

To achieve the foregoing and other objects, and in accordance with the purposes of the present invention as embodied and broadly described herein, the ferritic alloy having a bainitic or martensitic microstructure consists primarily of chromium (2.0 to 13.0 percent by weight), vanadium, tungsten and/or tantalum (0.3 to 1.5 percent by weight), carbon (0.075 to 0.30 percent by weight), manganese (0.01 to 15.0 percent by weight), and silicon (0.05 to 1.0 percent by weight). The remainder of the alloy is iron. The resulting alloy will be characterized by low activation properties and is devoid of subversive amounts of elements materially interfering with this characteristic. In general, other elemental additions to the alloy should total less than 0.5 percent of its total weight. The alloy content of nitrogen, niobium, molybdenum, nickel and copper should be maintained below maximum total weight percentages which have been developed theoretically from known characteristics of these elements when exposed to nuclear particle bombardment as follows: nitrogen—less than 0.33 percent by weight; niobium—less than 0.000029 percent by weight; molybdenum—less than 0.0003 percent by weight; nickel—less than 0.9 percent by weight; and copper—less than 0.12 percent by weight. Wherein if any one of these elements are present at the prescribed limit, none of the others may be present.

DESCRIPTION OF THE DRAWINGS

FIG. 1 is a carbide phase stability diagram for an iron-chromium-vanadium-carbon alloy system at 700° C.;

FIGS. 2 through 10 are enlarged photomicrographs showing the optical microstructures of described alloy samples 1-9, respectively;

DESCRIPTION OF THE PREFERRED EMBODIMENT ALLOY COMPOSITION

The objective of the work which lead to this disclosure was to provide guidance on the applicability of low activation bainitic and martensitic steels for fusion reactor structural components. These alloys, whether or not low activation, are also useful in liquid metal fast breeder reactors.

A series of low activation ferritic alloys was designed. The series consisted of: alloys similar to 2¼Cr-1Mo, with vanadium substituted for molybdenum; alloys similar to 9Cr-1Mo, with tungsten and/or vanadium substituted for molybdenum; and alloys similar to HT-9, with tungsten and/or vanadium substituted for molybdenum. The alloys were fabricated, irradiated, tested and examined following irradiation. The results have demonstrated that low activation alloys can be successfully produced in the ferritic alloy class. The 2¼Cr-V alloys develop excessive irradiation hardening due to precipitation following irradiation at 420° C. and the 2¼Cr-V and 9Cr-V/W alloys developed excessive softening due to precipitate coursening and dislocation recovery following irradiation at 585° C. In comparison, the 12Cr-W-V alloy appears to have excellent properties; $\alpha'$ precipitation at 420° in-reactor did not significantly increase strength, and reasonable strength was maintained after irradiation at 585° C., probably in part due to intermetallic precipitate development.

A significant advantage was gained by limiting alloy compositions of fusion reactor structural materials in order to control activation levels following irradiation and storage. Low activation steels were shown to be possible, provided the alloying additions of Nb, Mo, Cu, N and Ni are controlled. Based on theoretical calculations, the following maximum contents for these critical elements would apply to low activation ferritic alloys: Nb—2.9 ppm, Mo—30 ppm, Cu—0.12%, N—0.33% and Ni—0.91%. If any of these elements reach its maximum concentration limit, none of the other elements should be present.

For a low activation ferritic alloy class, such as compositional specification requires that niobium be essentially excluded, that substitutes be found for molybdenum and for nickel, and that nitride and copper precipitation not be used for hardening. Possible substitutes for molybdenum are tungsten, vanadium and tantalum. Manganese can be substituted for nickel. Within these restrictions, it is possible to obtain both low activation bainitic alloys (similar to $2\frac{1}{4}$Cr-1Mo) and low activation martensitic alloys (similar to 9Cr-1Mo and HT-9).

Figures 1, 2, 3:
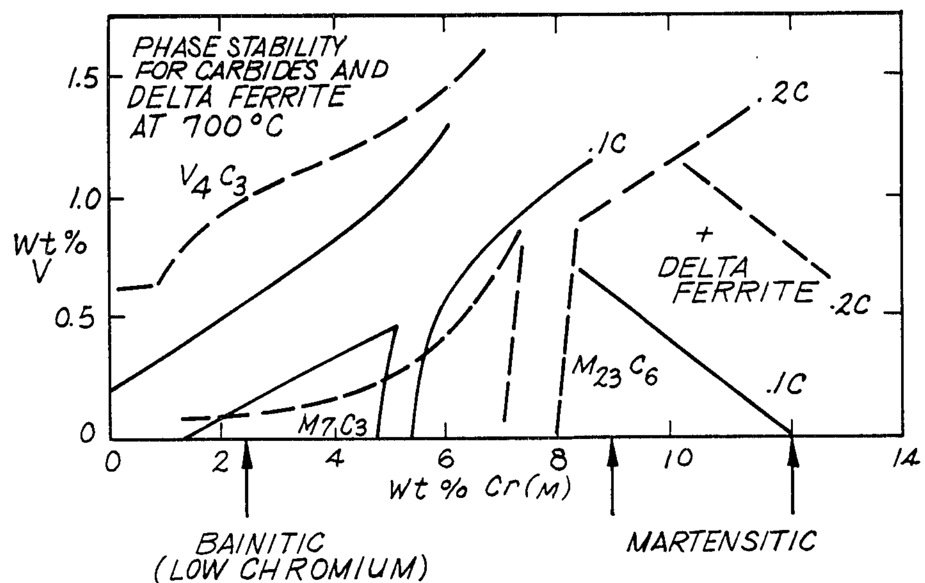

In order to develop low activation ferritic alloys with properties similar to commercial, heat resistant ferritic alloys, a substitute for molybdenum is the major requirement. Molybdenum is universally added to ferritic alloys to improve hardenability. Adjacent elements in the periodic table are V, Cr, Mn, Nb, Ta, W, Ti and Re, with V, Ta and W appearing to be the prime prospects. Most is known about effects of vanadium. For example, FIG. 1 provides a pseudo-carbide phase diagram for the Fe-Cr-V-C system at 700° C. Phase fields for $V_4C_3$, $M_7C_3$ and $M_{23}C_6$ are shown for 0.12C (solid lines) and for 0.2C (dashed lines). The boundaries defining the limits of delta ferrite formation at 0.1 (solid line) and 0.2C (dashed line) are also shown. From FIG. 1 it can be shown that for carbon contents on the order of 0.1%C, a bainitic alloy will contain only $V_4C_3$ above 0.5%V whereas for 0.2%C greater than 1%V is required. Also for chromium contents of 9% or greater, if vanadium contents are kept at 1% or below, only $M_{23}C_6$ is present as the stable phase.

Based on FIG. 1, several low activation steels can be envisioned. Bainitic alloys strengthened by $V_4C_3$ with carbon levels of 0.1% should be possible for vanadium levels above 0.5%. Martensitic alloys in the 9Cr range strengthened entirely by $M_{23}C_6$ should be possible for alloys with vanadium contents below 1% with 0.1C. However, in order to obtain $V_4C_3$ strengthening as well, higher carbon and/or vanadium contents are required. In the 12Cr range, careful alloy design is needed to avoid significant delta ferrite contents. Either carbon must be increased or other austenite formers, such as manganese, must be added.

Based on these observations, the series of bainitic and martensitic alloys given in Table 1 were defined and tested. Alloys 1 to 3 were similar to $2\frac{1}{4}$Cr-1Mo, but vanadium was substituted for molybdenum. Comparisons between these alloys indicates the optimum vanadium level required. Alloys 4 to 7 were similar to 9Cr-1Mo, but additions of vanadium, tungsten and manganese have been substituted for molybdenum. Note that alloy 4 included virtually no manganese and therefore based on FIG. 1, additions of vanadium must be kept below 0.5% in order to eliminate delta ferrite. Alloy 6 increased the vanadium level with a compensating increase in the carbon level and alloy 5 examined effects of increased manganese content on response. Alloy 7 was intended to investigate effects of tungsten additions. Alloys 8 and 9 were similar to HT-9, except that molybdenum was excluded and carbon levels were reduced. In order to compensate for the lower carbon levels, the manganese content was increased significantly. Alloy 8 contained no tungsten, whereas alloy 9 contained more tungsten than vanadium.

Test samples of the alloys listed in Table 1 were subjected to tensile testing and microstructural examinations both before and after irradiation in a nuclear reactor test facility (the Fast Flux Test Facility (FFTF) at Richland, WA) at 420° C., 520° C. and 585° C. to fluences as high as 14.5 dpa. Although this testing program cannot exactly duplicate a fusion reactor environment, it does provide an environment typical of a liquid metal fast breeder reactor which is similar to a fusion reactor. No operating fusion reactor now exists and therfore such an environment is not now available for testing. The completed testing has demonstrated that development of a low activation ferritic alloy is practical and possible.

Experimental Procedure

Alloys 1, 2 and 4 through 9 were manufactured as 18 lb billets. The alloys were vacuum induction melted into ingots approximately 5 cm square by 20 cm in height and then hot forged from 1150° C. into bar 1.25 cm×7 cm in cross section by 1 m in length. Chemical analysis was provided by the vendor. Alloy 3 was manufactured as a 68 lb ingot. The alloy was air melted into an ingot approximately 75 cm×10 cm×5 cm. The

TABLE 1

Low activation ferritic alloys with heat treatment and commercial alloy counterparts provided for comparison. Compositions were determined by the vendors.

| Alloy No. | Composition (w/o) | | | | | | | | | |
|---|---|---|---|---|---|---|---|---|---|---|
| | Cr | C | V | W | Mn | Si | N | P | S | |
| 1 A | 2.32 | 0.086 | 0.50 | <0.01 | <0.01 | 0.08 | 0.004 | <0.005 | 0.003 | |
| 2 A | 2.38 | 0.093 | 1.01 | <0.01 | <0.01 | 0.08 | 0.003 | <0.005 | 0.002 | |
| 3 A | 2.46 | 0.11 | 1.50 | — | 0.30 | 0.30 | 0.015 | 0.007 | 0.015 | Ti = 0.003<br>Cu = 0.04 |
| $2\frac{1}{4}$Cr—1Mo* | 2.25 | 0.09 | ≦0.03 | — | 0.45 | 0.20 | — | ≦0.015 | ≦0.015 | Mo = 1.0<br>Cu <0.35 |
| 4 B | 9.13 | 0.096 | 0.52 | 0.01 | 0.02 | 0.09 | 0.003 | <0.005 | 0.003 | |
| 5 C | 9.02 | 0.097 | 0.51 | 0.01 | 2.68 | 0.09 | 0.003 | <0.005 | 0.003 | |
| 6 C | 9.14 | 0.197 | 1.23 | 0.02 | 1.08 | 0.09 | 0.003 | <0.005 | 0.003 | |
| 7 C | 8.82 | 0.101 | 0.27 | 0.89 | 2.44 | 0.10 | 0.002 | <0.005 | 0.004 | |
| 9Cr—1Mo* | 8.75 | 0.10 | 0.2 | — | 0.45 | 0.35 | 0.05 | ≦.02 | ≦0.01 | Ni ≦0.40<br>Nb = 0.08<br>Mo = 0.90 |
| 8 C | 12.19 | 0.089 | 1.05 | <0.01 | 6.47 | 0.10 | 0.003 | <0.005 | 0.005 | |
| 9 C | 11.81 | 0.097 | 0.28 | 0.89 | 6.47 | 0.11 | 0.003 | <0.005 | 0.005 | |
| RT-9* | 12 | 0.20 | 0.3 | 0.5 | 0.6 | 0.4 | | ≦0.03 | ≦0.02 | Ni = 0.5<br>Mo = 1.0 |

*Nominal Commercial Alloy Compositions.
A = 900° C./20 hr/WQ to RT + 950/20 min/WQ to RT + 650/2 hr/AC.
B = 1000° C./20 hr/AC to RT + 1100/5 min/AC + RT + 700/2 hr/AC.
C = 1000° C./20 hr/AC to RT + 1100/10 min/AC + RT + 700/2 hr/AC.

chemical analysis was supplied by the vendor. A block of the as-melted material approximately 2 cm×2 cm×2 cm was provided for this study.

Specimens for examination and irradiation were prepared as follows. Specimens for tensile testing were of the sheet type geometry, 0.075 cm thick by 0.150 cm wide with gauge length 0.76 cm. The sheet direction was oriented normal to the rolling direction. Specimens for microstructural examination were 3 mm diameter disks 0.020 mm in thickness. The sheet direction was normal to the rolling direction. The heat treatments used are included in Table 1. Delta ferrite levels on the order of 1 to 2 percent are considered acceptable but alloy 8 was found to contain 5 percent delta ferrite after heat treatment optimization. As this was expected to be detrimental to mechanical properties, no tensile specimens were fabricated from alloy 8.

Specimens of the ferritic alloys were put into a materials testing assembly in an operational nuclear reactor test facility (FFTF) for irradiation purposes. Three identically loaded disk packets containing five disks of each alloy condition were placed in each of three canisters designed to operate at 420° C., 520° C. and 600° C. Three tensile specimens of each alloy (excluding alloy 8) were also irradiated in the 420° C. canister, but due to space limitations at 520° C. and 600° C., another canister was used to provide a higher irradiation temperature, 585° C.

The canister designed to operate at 600° C. experienced a brief 220° C. overtemperature transient. The other canisters were generally maintained within ±5° of their respective design temperatures. At the completion of the irradiation process, one disk packet and one tensile specimen were removed for each irradiation condition, except for the 600° C. overtemperature transient case where all packets were removed.

Post-irradiation tests and examinations were performed at room temperature using standard procedures. A hydraulically actuated modular testing machine with a 1000 pound load cell was used to test both unirradiated and irradiated specimens at a crosshead speed of $4\times10^{-4}$/sec. Metallographic examinations were performed on specimens etched with Vilella's etch. Microstructural examinations were performed on a JEM 1200EX scanning transmission electron microscope operating at 120 kV and outfitted with a Tracor Northern EDX detector and TN5500 computer and with a Gatan Electron energy loss spectrometer. Determination of precipitate compositions from extraction replicas involved computer analysis of EDX spectra which included analysis for tungsten. However, microstructural examination results are not included in this disclosure.

Optical metallography

The microstructures of the as-heat-treated low activation ferritic alloys were found to be typical of bainitic and martensitic steels, as shown by optical metallography. See FIGS. 2–10. However, differences between the alloys could be found and in one case, alloy 8 (FIG. 9), the amount of delta ferrite present was excessive. FIGS. 2–10 provide examples of the as-heat-treated alloys at 400×. Alloys 1 to 3 (FIGS. 2–4), in the 2¼Cr range show structures typical of tempered bainite, whereas structures typical of tempered martensite are found in alloys 4 through 9 (FIGS. 5–10). Careful examination of alloy 8 (FIG. 9) across the thickness of the billet has revealed that there was more delta ferrite at the edge of the billet than at the center. Therefore, some composition gradient is indicated, but the exact nature of the gradient has not been determined. From FIG. 9, the delta ferrite content in alloy 8 is estimated to be 5%. Therefore, it is apparent that the compositional specification for alloy 8 requires more austenite stability. For example, carbon content could be increased by 0.025%, manganese content could be increased by 0.75%, or chromium content could be decreased by 0.35%.

TABLE 2

Results of tensile tests at room temperature for low activation ferritic alloys with commercial alloy results given for comparison.

| Alloy | Dose (dpa) | Irrad Temp (°C.) | Yield Strength (MPa) | Ultimate Strength (MPa) | Uniform Elongation (%) | Total Elongation (%) |
|---|---|---|---|---|---|---|
| 2¼Cr—1MO* | — | — | ~480 | ~575 | — | ~15 |
| 2¼Cr—1MO* | 12 | 400 | 815 | 830 | 1.7 | 4.1 |
| 2¼Cr—1MO* | 12 | 550 | 460 | 530 | 18.5 | 21.2 |
| 1 | — | — | 778 | 900 | 5.3 | 13.9 |
| | — | — | 792 | 902 | 6.1 | 13.9 |
| | 6.0 | 420 | 1248 | 1279 | 0.8 | 8.3 |
| 2 | — | — | 288 | 566 | 16.6 | 28.5 |
| | — | — | 335 | 544 | 13.4 | 24.9 |
| | 9.5 | 420 | 1055 | 1086 | 1.0 | 8.1 |
| | 13.7 | 585 | 146 | 351 | 23.9 | 38.9 |
| 3 | — | — | 297 | 477 | 12.3 | 24.4 |
| | 6.0 | 420 | 706 | 755 | 1.7 | 6.1 |
| | 14.3 | 585 | 180 | 367 | 16.9 | 25.7 |
| 9Cr—1Mo | — | — | 575 | 690 | — | ~10 |
| 4 | — | — | 565 | 666 | 4.6 | 16.6 |
| | — | — | 567 | 664 | 4.0 | 14.9 |
| | 9.5 | 420 | 660 | 698 | 2.2 | 12.0 |
| | 14.3 | 583 | 310 | 460 | 12.8 | 22.7 |
| 5 | — | — | 565 | 673 | 5.7 | 14.8 |
| | — | — | 600 | 677 | 6.5 | 16.9 |
| | 7.7 | 420 | 599 | 670 | 5.9 | 15.8 |
| | 13.7 | 585 | 343 | 419 | 17.8 | 33.5 |
| 6 | — | — | 553 | 712 | 6.4 | >10.5 |
| | — | — | 578 | 731 | 6.8 | 17.6 |
| | 9.5 | 420 | 622 | 730 | 5.5 | 15.9 |
| | 13.7 | 585 | 367 | 562 | 18.3 | 30.2 |
| 7 | — | — | 587 | 716 | 5.6 | 15.8 |
| | 7.7 | 420 | 608 | 714 | 5.8 | 15.8 |

TABLE 2-continued

Results of tensile tests at room temperature for low activation ferritic alloys with commercial alloy results given for comparison.

| Alloy | Dose (dpa) | Irrad Temp (°C.) | Yield Strength (MPa) | Ultimate Strength (MPa) | Uniform Elongation (%) | Total Elongation (%) |
|---|---|---|---|---|---|---|
| Rt-9 | — | — | 610 | 760 | — | ~12 |
| 9 | — | — | 822 | 1002 | 2.3 | 10.1 |
| | 6.0 | 420 | 848 | 942 | 6.0 | 14.7 |
| | 14.3 | 585 | 531 | 749 | 9.3 | 19.4 |

*Tested at 205° C.

Tensile properties

The tensile properties of the as-heat-treated low activation alloys are listed in table 2, and were in most cases comparable to their commercial alloy counterparts. Exceptions were found for the bainitic alloys and the 12Cr alloy. The low vanadium bainitic alloy (alloy 1) was considerably stronger than 2¼Cr-1Mo (by 65%) but the other bainitic alloys were weaker, having much lower yield strengths, slightly lower ultimate tensile strengths and much higher elongations. The 12Cr martensitic alloy had significantly higher strength properties with comparable elongation response in comparison with HT-9. This may be due in part to differences in heat treatment. The properties for the commercial alloys are taken from a published reference. (Proceedings of Topical Conference on Ferritic Alloys for use in Nuclear Energy Technologies.)

However, following irradiation at 420° C. to between 6 and 10 dpa, the response could be divided into two types. The bainitic alloys all showed large increases in strength and decreases in elongation. 2¼Cr-1Mo also showed increases in strength and decreases in elongation but alloys 1 and 2 were considerably stronger than 2¼Cr-1Mo after irradiation at 420° C. In comparison, the 9Cr and 12Cr martensitic alloys showed only moderate (if any) increases in strength. This is quite different from the behavior of 9Cr-1Mo and HT-9, were significant hardening occurs following irradiation at 400° C. However, in all cases, elongation values for the low activation alloys remain acceptably high.

Irradiation at 585° C. to between 13.7 and 14.8 dpa resulted in considerable softening in all alloys. However, the smallest decrease occurred in alloy 9. In comparison, commercial alloys show a maximum of about 10% decrease in strength following irradiation at 585° C.

Figure 11:
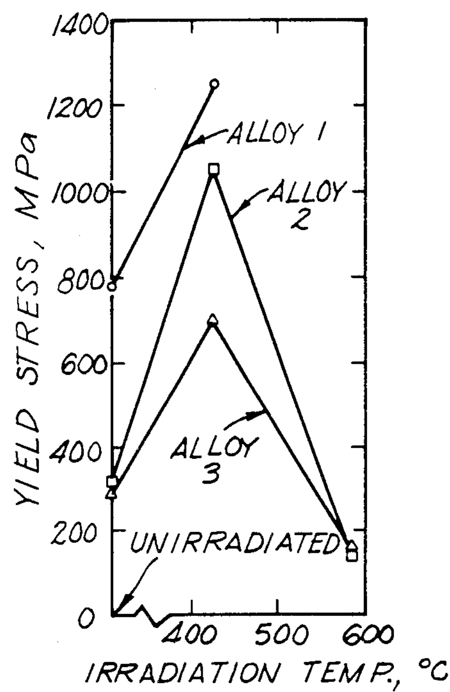
FIG. 11 is a plot of yield strength and irradiation temperature for alloy samples 1-3.
Figure 12:
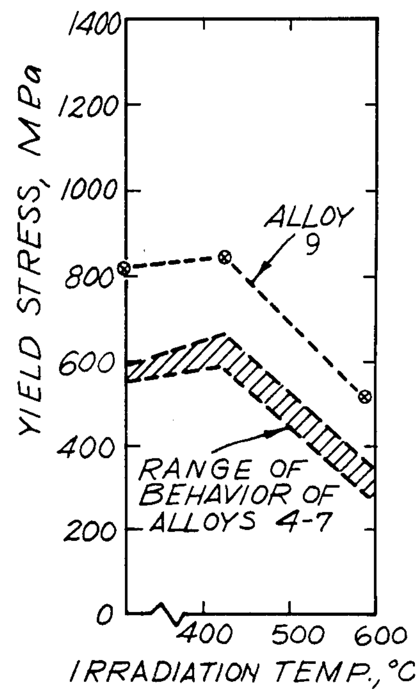
FIG. 12 is a plot of yield strength and irradiation temperature for alloy samples 4-7 and 9.
Figure 13:
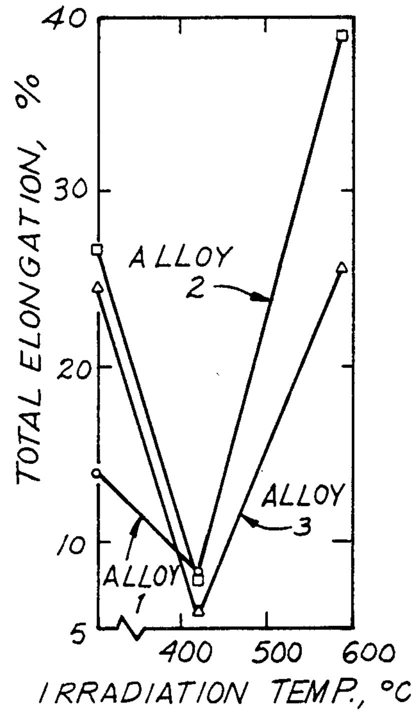
FIG. 13 is a plot of total elongation and irradiation temperature for alloy samples 1-3.
Figure 14:
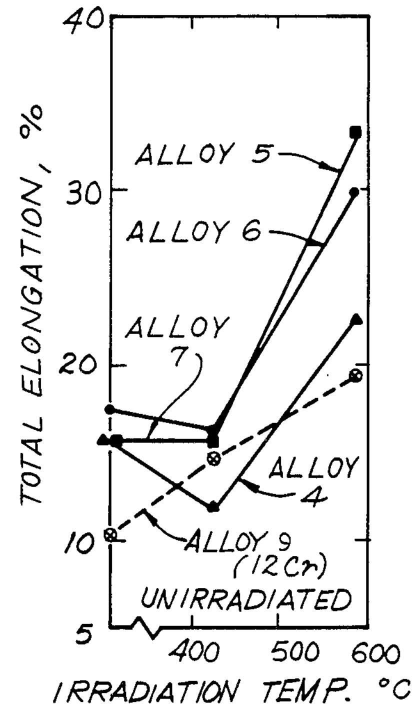
FIG. 14 is a plot of total elongation and irradiation temperature for alloy samples 4-7 and 9.

The results given in Table 2 have been represented graphically in FIGS. 11 through 14. FIGS. 11 and 12 provide comparison of yield strength response as a function of irradiation temperature. For the bainitic alloys (FIG. 11), the yield strength is increased 200 MPa following irradiation at 420° C., but following irradiation at 585° C., strength is greatly reduced. Hardening at 420° C. is much smaller in the martensitic alloys (FIG. 12) and reductions in strength for the 9Cr alloys after irradiation at 585° C. are not as large as those for the bainitic alloys. However, the strength remains high for the 12Cr alloys after irradiation at 585° C. FIG. 13 demonstrates that elongation is reduced more substantially in the bainitic alloys following irradiation at 420° C., but the lower elongation levels are still satisfactory.

The results of this investigation demonstrate clearly that a low activation ferritic alloy is possible if the tramp niobium content can be maintained below the acceptance limit of 3 ppm in commercial practice. We believe this limit can be obtained if the vanadium additions used are 99.99 percent pure and the melting system has not been previously used to melt niobium-containing alloys. The alloys in the present series have all been designed to eliminate other alloying elements which result in excessive long-term activity. In general, the alloys are weaker than presently available commercial alloy counterparts following irradiation at higher temperature. However, alloy 9 appears to be very promising because significant strength is retained even after irradiation at 585° C. whereas no significant hardening is found following irradiation at 420° C.

A preferred embodiment of the invention will contain from 2.0 to 13.0 weight percent of chromium; from 0.3 to 1.5 weight percent of vanadium, tungsten, or tantalum; from 0.075 to 0.30 weight percent carbon; from 0.01 to 15.0 weight percent manganese; and from 0.05 to 1.0 weight percent silicon; with the remainer being iron. In addition, the alloy will contain less than 0.01 weight percent phosphorous; less than 0.04 weight percent nitrogen; less than 0.01 weight percent sulphur; less than 0.003 weight percent copper; less than 0.012 weight percent molybdenum; less than 0.1 weight percent nickel; and less than 0.0003 weight percent niobium. The alloy shall be free of nitride and copper precipitates. In the range analagous to 2¼Cr-1Mo, the alloy preferably contains 2–3 weight percent chromium; in the range analagous 9Cr-1Mo, the alloy preferably contains 8–10 weight percent chromium; and in the range analagous to HT-9 the alloy preferably contains 10–13 weight percent chromium.

The foregoing description of the preferred embodiments of this invention has been presented for purposes of illustration and description. It is not intended to be exhaustive or to limit the invention to the precise steps disclosed. Obviously, many modifications and variations in the ferritic alloys are possible in view of the above teaching. The embodiments of the alloys described herein were selected in order to best explain the principles of the invention and its practical application so as to enable others skilled in this art to best utilize the invention. It is contemplated that various embodiments and modifications suited to a particular use will be utilized. It is intended that the scope of the invention be defined by the claims attached to this disclosure.

We claim:

1. A ferritic alloy having a banitic or martensitic microstructure when heated treated and tempered and characterized by low activation properties, said alloy consisting essentially of:

chromium—2.0 to 13 percent by weight;

vanadium or, tungsten, or tantalum in a total amount of—0.3 to 1.5 percent by weight;

carbon—0.075 to 0.30 percent by weight;

manganese—0.01 to 15.0 percent by weight;

silicon—0.05 to 1.0 percent by weight;

phosphorous—less than 0.01 percent by weight;
nitrogen—less than 0.04 percent by weight;
sulphur—less than 0.01 percent by weight;
copper—less than 0.003 percent by weight;
molybdenum—less than 0.12 percent by weight;
niobium—less than 0.003 percent by weight;
nickel—less than 0.1 percent by weight;
the remainder of the alloy being iron.

2. The alloy of claim 1 which is free from nitride and copper precipitates.

3. The alloy of claim 1 wherein the chromium content is between 2.0 to 3.0 percent by weight, and consists of between 0.5 to 1.5 percent vanadium by weight.

4. The alloy of claim 1 wherein the chromium content is between 8.0 to 10.0 percent by weight, and consists of between 0.5 and 1.5 percent vanadium by weight.

5. The alloy of claim 1 wherein the chromium content is between 8.0 to 10.0 percent by weight, and consists of between 0.5 and 1.5 percent tungsten by weight.

6. The alloy of claim 1 wherein the chromium content is between 10.0 to 13.0 percent by weight, and consists of between 0.5 and 1.5 percent vanadium by weight.

7. The alloy of claim 1 wherein the chromium content is between 10.0 to 13.0 percent by weight, and consists of between 0.5 and 1.5 percent tungsten by weight.

8. The alloy of claim 1 which has been heat treated and tempered such that the microstructure of said alloy is characterized by tempered bainite.

9. The alloy of claim 1 which has been heat treated and tempered such that the microstructure of said alloy is characterized by tempered martensite containing less than two percent delta ferrite.

* * * * *